United States Patent [19]

Herres et al.

[11] Patent Number: 5,177,136
[45] Date of Patent: Jan. 5, 1993

[54] AQUEOUS RELEASE AGENT FOR THE PRODUCTION OF POLYURETHANE MOLDINGS CONTAINING ETHOXYLATED ALCOHOL

[76] Inventors: Werner Herres, Dompfaffweg 2, D-8031 Eichenau; Thomas Galle, Hans-Wegmann-Str. 23a; Siglinde Rupp, Brucker Str. 1, both of D-8031 Maisach/Gernlinden, all of Fed. Rep. of Germany

[21] Appl. No.: 718,414

[22] Filed: Jun. 24, 1991

[30] Foreign Application Priority Data

Jun. 23, 1990 [DE] Fed. Rep. of Germany ....... 4020036

[51] Int. Cl.$^5$ ............................ C08K 5/04; C08K 5/05
[52] U.S. Cl. .................................. 524/376; 524/377; 523/403; 264/338
[58] Field of Search .................. 524/376, 377; 264/51, 264/338; 252/174.15, 351; 521/132, 51; 523/403

[56] References Cited

U.S. PATENT DOCUMENTS

| | | | |
|---|---|---|---|
| 3,637,566 | 1/1972 | Deex et al. | 524/376 |
| 4,609,511 | 9/1986 | Fischer et al. | 521/51 |
| 4,925,882 | 5/1990 | Makus | 521/132 |

Primary Examiner—Paul R. Michl
Assistant Examiner—LaVonda DeWitt
Attorney, Agent, or Firm—Larson and Taylor

[57] ABSTRACT

The invention provides an aqueous release agent for the production of polyurethane moldings, which in combination with a release surface contains one or more specific ethoxylated alcohols.

10 Claims, No Drawings

AQUEOUS RELEASE AGENT FOR THE PRODUCTION OF POLYURETHANE MOLDINGS CONTAINING ETHOXYLATED ALCOHOL

It is well known that polyurethanes are highly adhesive with respect to other materials, something that has led to the widespread use of polyurethanes for bonding purposes. However these adhesive properties entail very disadvantageous effects during the production of polyurethane moldings irrespectively of whether it is a question of a foam or solid polyurethane. Therefore it is necessary to employ a release agent for the production of such moldings, which are applied to the inner mold surfaces which are to come into contact with the polyurethane systems. Such release agents are typically on the basis of waxes, soaps and/or oils and application is by spraying onto the open mold, the quantity of the release agent being less significant than the evenness of application. Such application has to be repeated after each demolding operation.

In contradistinction to prior methods, in which solvent-containing release agents were used exclusively, present-day practice is to utilize release agents on an aqueous basis in order to reduce the harm to the environment as a replacement for the solvent based release agents, examples of such aqueous release agents being those containing high molecular hydrocarbons. Examples of such materials are aqueous dispersions of polyethylene waxes, aqueous emulsions of paraffins or aqueous emulsions of polyols, that is to say unsaturated oligimeric or polymeric hydrocarbons, the waxes, paraffins and/or polyols being selected by the man in the art in accordance with the desired application.

Investigations have basically however shown that in this case of aqueous release agents the adjuvants, such as emulsifiers, adhesion promoting materials etc, not only have a disadvantageous effect on the desired release effect but furthermore impair the nature of the surface of the molding.

Accordingly one object of the present invention is to provide an aqueous release agent for the production polyurethane moldings which entails a substantial reduction in the quantity of conventional emulsifiers, leads to an enhanced release effect and furthermore represents a material with which more particularly the quality of the properties of the molding surface may be substantially improved.

This object is attained in accordance with the present invention by an aqueous release agent which contains release substances in combination with one or more ethoxylated alcohols of the general formula:

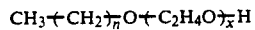

wherein:
n denotes a whole number of 22 to 60 and preferably 28 to 52 and
x denotes a whole number of 2 to 50 and more preferably 3 to 40.

The aqueous release agent in accordance with the invention contains the ethoxylated alcohol or mixtures thereof in a quantity of 0.5 to 40% and preferably in a quantity of 1 to 20% of the overall weight of the release agent.

In the presence of other release substances the ethoxylated alcohols employed in accordance with the invention entail a synergistic effect such that the release action as such and the quality of the molding surface are enhanced to a high degree. This favorable effect occurs equally in the case of application to flexible, semi-flexible and hard foams and in the case of filled and/or fiber reinforced PU molded components with or without an integral surface.

In accordance with the present invention the release substance preferably at least partly consists of one or more unsaturated oligomeric or polymeric hydrocarbons, optionally in combination with foam stabilizers suitable for polyurethane systems, the unsaturated oligomeric or polymeric hydrocarbons having a molecular weight of at least 500 and preferably 1,000 to 10,000 with a preferred range of 2,500 to 6,00 and iodine numbers of at least 60 and preferably 150 to 600.

The unsaturated hydrocarbons preferably employed in the combination in accordance with the invention may be homo- or copolymers or, respectively, block polymers and are preferably such that they are able to flow or are liquid at room temperatures and under the conditions of processing. They preferably do not contain the double bonds in a conjugated form so that the unsaturated hydrocarbons which are particularly preferred in the invention include those which are oligomers or polymers of isoprene and/or butadiene and may be optionally copolymerized or block polymerized with other monomers polymerizable therewith. Furthermore they may additionally contain functional groups, more particularly groups which contain oxygen and/or nitrogen and have such groups as contain Zerewitinoff active hydrogen atoms.

An unsaturated hydrocarbon which is more particularly to be used in the invention is a liquid polybutadiene, which is referred to as UKW liquid in the examples, and has a molecular weight of approximately 3,000 and an iodine number of approximately 450.

The aqueous release agent in accordance with the invention contains the unsaturated hydrocarbons preferably in a quantity equal to 0.5 to 50%, and more particularly of 1 to 30%, of the overall weight of the release agent. The quantities which are best suited to the respective polyurethane system are to be determined experimentally in a conventional manner as familiar to those in the art.

The aqueous release agent in accordance with the invention may furthermore contain as a release substance at least in part a silicone oil which is conventional for this purpose, preferably a polydimethylsilicone, which may be substituted with aliphatic and/or aromatic hydrocarbon radicals, and/or at least in part fats and/or oils, which are conventional for this purpose, and/or at least in part a liquid or solid natural or synthetic wax, which is conventional for this propose. Furthermore, as release substances it is possible to utilize at least in part esters of natural and/or synthetic carboxylic acids with mono- or polyvalent alcohols.

Furthermore additionally conventional emulsifiers may be employed in conventional quantities.

As foam stabilizers it is possible to use the foam stabilizers which are conventional for the respective polyurethane foam system. Foam stabilizers which are preferred in the invention include polysiloxane polyether copolymers with various different structures, as they are for instance described in the textbook "Polyurethane" by Becker and Braun published by Hanser Verlag, Munich and in the U.S. Pat. Nos. 2,834,748, 2,917,480 and 3,629,308 and in the German patent publication 2,558,523 A.

Moreover the aqueous release agents in accordance with the invention may contain conventional additives, as for instance biocidal substances, amine compounds, quaternary ammonium compounds, surface modifying substances (bentonites) etc.

The following examples will serve to explain the invention without however limiting the same.

EXAMPLE 1

An aqueous release agent, which is utilized during production of flexible polyurethane foam moldings, has the following composition:
- 16% by weight of UKW liquid (see supra)
- 4% by weight of ethoxylated alcohol with n equal to 29 and x equal to 10.
- 1% by weight of the foam stabilizer DC 190 (commercially available from the Dow Corning Company)
- 79% of water.

EXAMPLE 2

A further aqueous release agent, which is employed during production of glass fiber reinforced rigid polyurethane foam moldings with an integral surface has the following composition:
- 10% by weight of Microwax (fusion point 70° C.)
- 2% by weight of ethoxylated alcohol with n equal to 49 and x equal to 4.
- 4% by weight of ethoxylated alcohol with n equal to 29 and x equal to 10.
- 3% by weight of emulsifier: Mulsifan RT 231, a combination of alkylaryl- and alkylpolyglycolehters (commercially available from the Zschimmer & Schwarz Company)
- 2% by weight of modified silicone oil as commercially available from the Wacker Company under the designation "Wacker TN"
- 79% by weight of water.

We claim:

1. An aqueous release agent for polyurethane moldings and more particularly for polyurethane foam moldings comprising essentially water, release substances and emulsifiers, characterized in that it contains the release substances in combination with one or more ethoxylated alcohols of the general formula

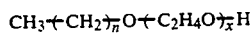

$$CH_3 (CH_2)_n O (C_2H_4O)_x H$$

wherein:
n denotes a whole number of 22 to 60 and preferably 28 to 52, and
x denotes a whole number of 2 to 50 and preferably 3 to 40.

2. The aqueous release agent as claimed in claim 1, characterized in that it comprises the ethoxylated alcohol or mixtures thereof in a quantity of 0.5 to 40%, and preferably 1 to 20%, of the overall weight of the release agent.

3. The aqueous release agent as claimed in claim 1, characterized in that as the release substances it contains at least partly one or more unsaturated oligomeric or polymeric hydrocarbons, having a molecular weight of at least 500 and preferably 1,000 to 10,000 and iodine numbers of at least 60 and preferably 150 to 600.

4. The aqueous release agent as claimed in claim 1, characterized in that the unsaturated hydrocarbons are oligomers or polymers of isoprene and/or butadiene, which may optionally be copolymerized or block copolymerized with other monomers, which are able to be polymerized therewith.

5. The aqueous release agent as claimed in claim 1, characterized in that it contains the unsaturated hydrocarbons in a quantity of 0.5 to 50%, and more particularly in a quantity of 1 to 30%, of the overall weight of the release agent.

6. The aqueous release agent as claimed in claim 1, characterized in that in combination with the release substances it contains foam stabilizers which are suitable for polyurethane systems, preferably in a quantity equal to 0.2 to 6% and preferably 0.5 to 3%, of the overall weight of the release agent.

7. The aqueous release agent as claimed in claim 1, characterized in that as the release substance it contains at least in part a silicone oil which is conventional for this purpose and is preferably a polydimethylsilicone which is optionally substituted with aliphatic and/or aromatic hydrocarbon radicals.

8. The aqueous release agent as claimed in claim 1, characterized in that as a release substance it contain at least in part fats and/or oils which are conventional for this purpose.

9. The aqueous release agent as claimed in claim 1, characterized in that as a release substance it contains at least in part a liquid or solid natural or synthetic wax which is conventional for this purpose.

10. The aqueous release agent as claimed in claim 1, characterized in that as a release substance it contains at least in part esters of natural and/or synthetic carboxylic acids with monovalent or polyvalent alcohols.

* * * * *